United States Patent
Nagashima et al.

(10) Patent No.: US 8,207,705 B2
(45) Date of Patent: Jun. 26, 2012

(54) CHARGING APPARATUS AND CHARGING METHOD

(75) Inventors: Osamu Nagashima, Tokyo (JP); Kei Tashiro, Kanagawa (JP); Yoichi Miyajima, Tokyo (JP); Toshio Takeshita, Kanagawa (JP)

(73) Assignee: Sony Corporation, Tokyo (JP)

( * ) Notice: Subject to any disclaimer, the term of this patent is extended or adjusted under 35 U.S.C. 154(b) by 390 days.

(21) Appl. No.: 12/497,188

(22) Filed: Jul. 2, 2009

(65) Prior Publication Data

US 2010/0045242 A1 Feb. 25, 2010

(30) Foreign Application Priority Data

Aug. 22, 2008 (JP) ................................. 2008-214617

(51) Int. Cl.
- H02J 7/00 (2006.01)
- H02J 7/16 (2006.01)
- B60K 6/20 (2007.10)

(52) U.S. Cl. ........ 320/132; 320/128; 320/134; 320/136; 320/152; 320/157; 180/65.21; 180/65.265; 180/65.27; 903/903; 903/904; 903/907

(58) Field of Classification Search ................... 320/132
See application file for complete search history.

(56) References Cited

U.S. PATENT DOCUMENTS

| | | | |
|---|---|---|---|
| 2008/0048614 A1* | 2/2008 | Partin et al. ................... | 320/116 |
| 2008/0238372 A1* | 10/2008 | Cintra et al. .................. | 320/137 |

FOREIGN PATENT DOCUMENTS

| | | | |
|---|---|---|---|
| JP | 9-247864 | | 9/1997 |
| JP | 2000-209789 | A | 7/2000 |
| JP | 2002-315204 | A | 10/2002 |
| JP | 2002315204 | A * | 10/2002 |
| JP | 2003-244862 | | 8/2003 |
| JP | 2005-73433 | A | 3/2005 |
| JP | 2008-61373 | A | 3/2008 |

OTHER PUBLICATIONS

U.S. Appl. No. 13/240,973, filed Sep. 22, 2011, Takeshita, et al.

* cited by examiner

*Primary Examiner* — Edward Tso
*Assistant Examiner* — Ahmed Omar
(74) *Attorney, Agent, or Firm* — Oblon, Spivak, McClelland, Maier & Neustadt, L.L.P.

(57) ABSTRACT

The present invention provides a charging apparatus capable of efficiently charging battery in view of power consumption and a charging method. The charging apparatus has a charging unit which charges a battery, a remaining capacity detecting unit which detects remaining capacity of the battery, a necessary charging capacity obtaining unit which obtains charging capacity necessary for use after completion of the charging of the battery, an additional charging capacity calculating unit which calculates additional charging capacity for additionally charging the battery based on the remaining capacity and the necessary charging capacity of the battery, a charging current determining unit which determines a charging current at the time when the charging unit charges for the additional charging capacity based on power consumption generated at the time of charging for the additional charging capacity, and a control unit which controls the charging unit based on the determined charging current.

6 Claims, 10 Drawing Sheets

CHARGING APPARATUS AND CHARGING METHOD

BACKGROUND OF THE INVENTION

1. Field of the Invention

The present invention relates to a charging apparatus and a charging method.

2. Description of the Related Art

In related art, battery packs including secondary battery such as lithium ion battery, NiCd battery or nickel hydride battery are publicly known.

The publicly-known battery packs have a microcomputer which calculates a remaining battery capacity and communicates with an electronic device using a battery as a power source, a peripheral circuit of the microcomputer and a circuit for detecting a state of a battery cell for calculating the remaining battery capacity by means of the microcomputer. Japanese Patent Application Laid-Open No. 9-247864 discloses a technique which detects a remaining capacity of a battery cell based on a current integrating amount at the time of charging/discharging when a remaining capacity of the battery cell is calculated.

SUMMARY OF THE INVENTION

In recent years, an attention is typically paid to a depletion issue of energy such as crude, and energy saving in our lives becomes important. When lithium ion secondary batteries are charged, a charging current is set to be high for charging so that a calorific power increases due to impedance of a charging path. The electric power is uselessly consumed at the time of charging due to the heat generation.

The present invention has been made in view of the above issue, and it is desirable to provide new and improved charging apparatus and charging method which can charge batteries efficiently in view of power consumption.

According to an embodiment of the present invention, there is provided a charging apparatus including: a charging unit which charges a battery, a remaining capacity detecting unit which detects remaining capacity of the battery, a necessary charging capacity obtaining unit which obtains charging capacity necessary for use after completion of the charging of the battery, an additional charging capacity calculating unit which calculates additional charging capacity for additionally charging the battery based on the remaining capacity and the necessary charging capacity of the battery, a charging current determining unit which determines a charging current at the time when the charging unit charges for the additional charging capacity based on power consumption generated at the time of charging for the additional charging capacity, and a control unit which controls the charging unit based on the determined charging current.

The charging apparatus may include a charging time calculating unit which calculates charging time required for charging for the additional charging capacity based on the determined charging current and the additional charging capacity.

The charging apparatus may include a charging time output unit which outputs the calculated charging time.

The charging apparatus may include a desired charging time obtaining unit which obtains desired charging time at the time of charging for the additional charging capacity, and the charging current determining unit may determine the charging current based on the power consumption and the desired charging time.

The necessary charging capacity obtaining unit may obtain expected use time of the battery so as to calculate charging capacity necessary for use after the completion of the charging of the battery.

Furthermore, according to another embodiment of the present invention, there is provided a charging method including the steps of: charging a battery; detecting remaining capacity of the battery; obtaining charging capacity necessary for use after completion of the charging of the battery; calculating additional charging capacity for additionally charging the battery based on the remaining capacity and the necessary charging capacity of the battery; determining a charging current at the time when the charging unit charges for the additional charging capacity based on power consumption generated at the time of charging for the additional charging capacity; and controlling the charging unit based on the determined charging current.

According to the embodiments of the present invention, batteries can be charged efficiently in view of power consumption.

DETAILED DESCRIPTION OF PREFERRED EMBODIMENTS

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

(Configuration of Battery Pack)

Figure 1:
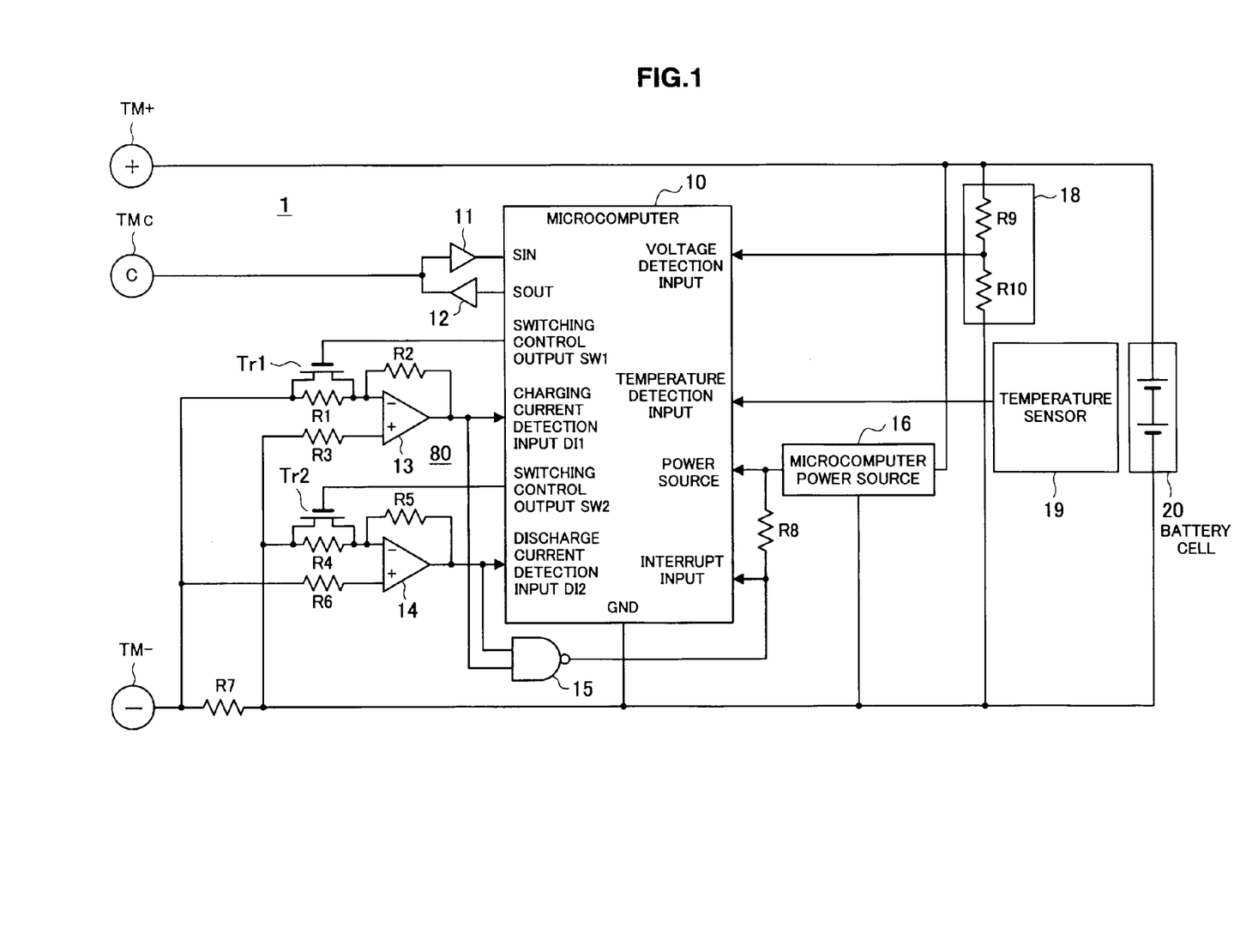
FIG. 1 is a circuit diagram illustrating a configuration of a battery pack according to one embodiment of the present invention.

A configuration of a battery pack according to one embodiment of the present invention is described. FIG. 1 is a circuit diagram illustrating the configuration of the battery pack according to the embodiment of the present invention.

A battery cell 20 is, for example, a lithium ion secondary battery. The battery pack 1 according to the embodiment shown in FIG. 1 has the battery cell 20 which is charged and discharged, a current detecting unit 80 and a microcomputer 10. The current detecting unit 80 detects a charging/discharging current i [mA] of the battery cell 20, and amplifies it by a predetermined gain G [V/mA] so as to output a voltage e[V].

The microcomputer 10 has an A/D converting means and an arithmetic means. The A/D converting means A/D-converts the current detected voltage e[V] from the current detecting unit 80 at a quantizing step q [V/LSB] so as to obtain a digital value x. The arithmetic means calculates a remaining capacity Y [mAh] of the battery cell 20 in each constant cycle t [h: hour] using the digital value x from the A/D converting means.

In the battery pack 1 according to the embodiment, a positive electrode of the battery cell 20 is connected to a plus terminal TM+ of the battery pack 1, and a negative electrode of the battery cell 20 is connected to a minus terminal TM− of the battery pack 1 via a current-voltage detecting resistance R7.

A power source from a microcomputer power source 16 including a series regulator and a rest circuit is supplied to the microcomputer 10 contained in the battery pack 1, and the microcomputer 10 operates by mean of the power source supplied from the microcomputer power source 16. A charging current detection input terminal DI1 of the microcomputer 10 is connected to an output terminal of an operational amplifier 13 provided for detecting a charging current. A discharging current detection input terminal DI2 is connected to an output terminal of an operational amplifier 14 provided for detecting a discharging current. Further, an interrupt input terminal of the microcomputer 10 is connected to an output terminal of two-input NAND gate 15 whose two input terminals are connected to output terminals of the operational amplifiers 13 and 14, respectively. The output terminal of the 2-input NAND gate 15 is connected to the microcomputer power source 16 via a resistance R8 for pull-up.

A temperature detection input terminal of the microcomputer 10 is connected to an output terminal of a temperature sensor 19 which detects ambient temperature of the battery cell 20. A voltage detection input terminal is connected to an output terminal of a voltage detecting circuit 18 which detects an inter-terminal voltage of the battery cell 20. A ground terminal is connected to the negative electrode of the battery cell 20. An input terminal (SIN terminal) and an output terminal (SOUT terminal) for communication are connected to buffer amplifiers 11 and 12, respectively.

All the charging current detection input terminal DI1, the discharging current detection input terminal DI2, the temperature detection input terminal and a voltage detection input terminal on which analog input is performed are A/D input ports. The microcomputer 10, therefore, contains an A/D converter which converts an analog signal into a digital signal.

A noninverting input terminal of the operational amplifier 13 is connected to the negative electrode of the battery cell 20 via a resistance R3 and the resistance R7 for detecting a current and a voltage, and an inverting input terminal is connected to a negative feedback resistance R2 for setting a gain and a resistance R1. Therefore, a voltage value, which is obtained by amplifying a value of a current flowing in the battery pack 1 (the current value at the time of charging) according to a ratio between the values of the resistances R1 and R2 (R2/R1), is output from the output terminal of the operational amplifier 13.

On the other hand, a noninverting input terminal of the operational amplifier 14 is connected to the negative electrode of the battery cell 20 via a resistance R6, and an inverting input terminal is connected to a negative feedback resistance R5 and a resistance R4. Therefore, a voltage value, which is obtained by amplifying a vale of a current flowing in the battery pack 1 (current value at the time of discharging) according to a ratio between values of the resistances R4 and R5 (R5/R4), is output from an output terminal of the operational amplifier 14.

(Calculation of Remaining Battery Capacity)

Next, calculation of a remaining battery capacity in the microcomputer 10, namely, an integrating operation of a charging/discharging current value based on output values from the operational amplifiers 13 and 14 is described below. The operational amplifiers 13 and 14 are used as a charging current detecting amplifier and a discharging current detecting amplifier of the current detecting unit 80.

The current detecting unit 80 detects a charging/discharging current i[mA] flowing in the resistance R7. The current detecting unit 80 performs current-voltage conversion so as to amplify the charging/discharging current i[mA] using a predetermined gain G[V/mA], and outputs a voltage e=iG[V]. The current detecting unit 80 sends the voltage e[V] to the charging current detecting input terminal DI1 and the discharging current detecting input terminal DI2 as the A/D input ports of the microcomputer 10 as the arithmetic means.

The A/D converting means in the microcomputer 10 (A/D converter) quantizes the input voltage e[V] using a predetermined quantization width or a quantization step q [V/LSB] so as to convert it into a digital value x=e/q (=iG/q). The arithmetic means in the microcomputer 10 makes a calculation in every constant arithmetic cycle T [h: hour] based on the digital value x.

A decrease/increase $\Delta Y$ of the remaining battery capacity due to the flowing of the current i for the arithmetic cycle T becomes $iT=(xq/G) \cdot T$[mAh]. When the increase/decrease $\Delta Y$ is expressed by the digital data x obtained by the A/D conversion, $\Delta Y=(qT/G) \times x$. When values q, T and G are set so that a multiplier coefficient qT/G at this time becomes $2^n$, $\Delta Y=2^n \times x$, and the increase/decrease $\Delta Y$ of the remaining battery capacity can be calculated simply by bit shift.

Positive (+) of the current i corresponds to charging, negative (−) corresponds to discharging. At this time, in the example of FIG. 1, the operational amplifier 13 detects the charging current $i_1$ in the charging/discharging current flowing in the resistance R7, and the operational amplifier 14 detects the discharging current $i_2$, so as to send them as positive voltages $e_1$ and $e_2$ to the charging current detection input terminal DI1 and the discharging current detection input terminal DI2 of the microcomputer 10.

Therefore, the increase/decrease $\Delta Y$[mAh] of the remaining battery capacity data Y[mAh] in every arithmetic cycle T become as follows:

$$\Delta Y = (i_1 - i_2) \times T$$
$$= (e_1 - e_2) \times T/G$$
$$= (x_1 - x_2) \times qT/G.$$

$x_1$ is a digital value obtained by digitally converting the voltage $e_1$ sent to the charging current detection input terminal DI1 by means of the A/D converter in the microcomputer 10. Further, $x_2$ is a digital value obtained by digitally converting the voltage $e_2$ sent to the discharging current detection input terminal DI2 by means of the A/D converter in the microcomputer 10.

When $qT/G=2^n$, $\Delta Y=(x_1-x_2)\times 2^n$, and the calculation can be made easily by bit shift.

(Arithmetic Operation of the Remaining Battery Capacity)

The arithmetic operation of the remaining battery capacity according to the integration of the charging/discharging current value in the microcomputer 10 is described below.

At the first step, the remaining battery capacity data Y[mAh] is set to a remaining capacity initial value $Y_0$[mAh]. This is expressed by $Y \leftarrow Y_0$.

At the second step, the increase/decrease $\Delta Y$, namely, $(x_1-x_2)\times 2^n$ is added to the previous remaining battery capacity data Y[mAh], and the obtained value is stored as new remaining battery capacity data Y[mAh] in an internal memory, not shown, of the microcomputer 10. This is expressed by $Y \leftarrow Y+(x_1-x_2)\times 2^n$.

At the third step, after the process waits for by constant time T of the arithmetic cycle, the process returns to the first step.

A relationship among the gain G[V/mA] including the current-voltage conversion of the current detecting unit 80, the quantizing step q[V/LSB] at the time of the A/D conversion of the microcomputer 10 and the cycle of the integrating operation of the charging/discharging current value in the microcomputer 10, namely, an updating cycle T[h] of the remaining battery capacity is selected as $qT/G=2^n$. As a result, the current value integrating amount or the remaining battery capacity can be calculated by bit shift without integration of coefficient.

An amplification gain of the operational amplifier 13 composing the current detecting unit 80 is determined by a ratio between the resistances R1 and R2 as described above, and an amplification gain of the operational amplifier 14 is determined by a ratio between the resistances R4 and R5 as described above. A current-voltage converting ratio is determined by the resistance R7. The amplification gain of the operational amplifier 13 for detecting a charging current is the same as the amplification gain of the operational amplifier 14 for detecting a discharging current, but may be different from each other. The quantizing step q of the A/D conversion in the microcomputer 10 is mostly fixed by IC. The arithmetic cycle T can be changed arbitrarily by software.

For example, when $q/G=2^k$[mA/LSB], $T[h]=\frac{1}{2^m}$[h] (k and m are integers), the increase/decrease $\Delta Y$[mAh] in every arithmetic cycle T becomes as follows:

$$\Delta Y = (x_1 - x_2) \times qT/G$$
$$= (x_1 - x_2) \times 2^{k-m}$$

Since the remaining battery capacity data Y[mAh] in each arithmetic cycle T may be updated according to $Y \leftarrow Y+(x_1-x_2)\times 2^{k-m}$, the current amount integrated value can be calculated only by adding and subtracting operations and (n−m) times of bit shift.

In the battery pack and the remaining battery capacity data output method according to the embodiment of the present invention, the charging/discharging current i[mA] of the battery cell to be charged or discharged is detected, and is amplified by the predetermined gain G[V/mA] so that the voltage e[V] is output. The current detected voltage e[V] is A/D-converted at the quantizing step q[V/LSB] so that a digital value x is obtained. The remaining battery cell capacity Y[mAh] is calculated in every constant cycle T[h: hour] so that the increase/decrease $\Delta Y$ for calculating the remaining battery cell capacity Y is expressed as follows by using the digital value x obtained in every constant cycle T:

$$\Delta Y = (xq/G) \times T$$
$$= (qT/G) \times x$$

The relationship among the gain G[V/mA] of the current detecting unit and the quantizing step q[V/LSB] at the time of the A/D conversion and the arithmetic cycle T[h] of the arithmetic means is expressed as follows:

$qT/G=2^n$ (n is integer), and the increase/decrease $\Delta Y$ of the remaining battery capacity is calculated as follows:

$\Delta Y=2^n \times x$

According to the embodiment, the relationship among the gain G[V/mA] and the quantizing step q[V/LSB] and the arithmetic cycle t[h] is set so that LSB of the digital value obtained by digitally converting the current detected voltage e[V] becomes $2^n$. As a result, the current integrated amount can be obtained by simple arithmetic, and thus an increase in an amount of software of the microcomputer and an increase in the arithmetic time can be prevented.

(Normal Operation Mode and Power Saving Mode)

Further, the battery pack 1 shown in FIG. 1 according to the embodiment is described. The battery pack 1 shown in FIG. 1 according to the embodiment further has a transistor switch Tr1 and a transistor switch Tr2.

The transistor switch Tr1 is composed of a field-effect transistor, and its gate is connected to a switching control output terminal SW1 of the microcomputer 10, and the resistance R1 is inserted to be connected between its drain and its source.

Therefore, when a signal level from the switching control output terminal SW1 of the microcomputer 10 is in high (H) level, the transistor switch Tr1 is turned ON. As a result, the value of the resistance R1 becomes approximately 0 (only internal resistance of the transistor switch Tr1), and an amplification gain of the operational amplifier 13, which is set according to the ratio between the values of the resistances R1 and R2 (R2/R1) becomes large.

On the other hand, when the signal level from the switching control output terminal SW1 of the microcomputer 10 is in low (L) level, the transistor switch Tr1 is turned OFF. As a result, the amplification gain of the operational amplifier 13 becomes an amplification gain according to the ratio between the values of the resistances R1 and R2 (R2/R1), namely, the amplification gain smaller than that at the time when the transistor switch Tr1 is ON.

Similarly, the transistor switch Tr2 is composed of a field-effect transistor, and its gate is connected to a switching control output terminal SW2 of the microcomputer 10, and the resistance R4 is inserted to be connected between its drain and its source.

Therefore, when a signal level from the switching control output terminal SW2 of the microcomputer 10 is in high (H) level, the transistor switch Tr2 is turned ON. As a result, a value of the resistance R4 becomes approximately 0 (only an internal resistance of the transistor switch Tr2), and an amplification gain of the operational amplifier 14 becomes large.

On the other hand, when the signal level from the switching control output terminal SW2 of the microcomputer 10 is in low (L) level, the transistor switch Tr2 is turned OFF. As a result, the amplification gain of the operational amplifier 14 becomes small.

The microcomputer 10 constantly monitors levels of the charging current detection input terminal DI1 and the discharging current detection output terminal DI2 at the normal operation mode (Run). When the terminals DI1 and DI2 are in a constant or more level, both the signal levels of the switching control output terminals SW1 and SW2 are in low level. As a result, both the transistor switches Tr1 and Tr2 are OFF, and the amplification gains of the operational amplifiers 13 and 14 become small.

Therefore, the microcomputer 10 in the normal operation mode (Run) can measure a current value in the battery pack 1 (current value at the time of charging or current value at the time of discharging) using the output values from the operational amplifiers 13 and 14 whose amplification gains are small. For this reason, the microcomputer 10 can recognize the current value at the time of charging and discharging, so as to be capable of calculating the charging/discharging current integrated value.

On the contrary, at the time of the normal operation mode (Run), when the charging/discharging current value in the battery pack 1 becomes a minute current value not more than a predetermined value, the amplification gains are made to be small so that the output values from the operational amplifiers 13 and 14 become small. That is to say, the levels of the charging current detection input terminal DI1 and the discharging current detection input terminal DI2 of the microcomputer 10 become small. At this time, the levels of the terminals DI1 and DI2 become not more than the constant value, and if this state continues for constant and more time, the microcomputer 10 determines as being in a no-load state, and moves into an energy saving mode (sleep mode). In this energy saving mode, power consumption becomes smaller than that in the normal operation mode, and thus, the energy of the circuit can be saved.

The microcomputer 10 in the energy saving mode (sleep mode) brings both the signal levels of the switching control output terminals SW1 and SW2 into high level. As a result, both the transistor switches Tr1 and Tr2 are turned ON, and the amplification gains of the operational amplifiers 13 and 14 become large. Therefore, the microcomputer 10 in the energy saving mode (sleep mode) can measure the minute current value in the battery pack 1 (minute current value at the time of charging or minute current value at the time of discharging) using the output values from the operational amplifiers 13 and 14 whose amplification gains are large.

In the energy saving mode, when the charging/discharging current value in the battery pack 1 becomes a value not less than the predetermined value, both the output values from the operational amplifiers 13 and 14 whose amplification gains are small become large. That is to say, levels of the two input terminals of the two-input NAND gate 15 are in high level, and thus, outputs from the two-input NAND gate 15 are in low level. When the output levels of the two-input NAND gate 15 supplied to the interrupt input terminal become low level, the microcomputer 10 cancels the energy saving mode so as to move into the normal operation mode.

As described above, according to the configuration in FIG. 1, since the power consumption in the energy saving mode is smaller than that in the normal operation mode, the energy of the circuit can be saved. According to the configuration in FIG. 1, microcomputer 10 controls the ON/OFF states of the transistors Tr1 and Tr2 at the switching control outputs SW1 and SW2, so as to be capable of switching the amplification gains of the operational amplifier 13 and 14. As a result, the minute current value in the energy saving mode can be detected and also the current value in the normal operation mode can be measured in this configuration.

(Communication Between the Battery Pack 1 and the Charging Apparatus)

At least the microcomputer 10, the battery cell 20 and the current detecting unit 80 are provided to the battery pack 1. The microcomputer 10 includes a communication circuit which communicates with the charging apparatus 100, and an information generating circuit which generates information representing the state of the battery pack 1.

The information generating circuit generates remaining battery capacity information, charging/discharging current detection information, battery cell voltage detection information, temperature detection information and a flag at the time of reaching a maximum charging/discharging cycle as the information representing the state of the battery pack 1. The communication between the microcomputer 10 of the battery pack 1 and the charging apparatus 100 is established via buffer amplifiers 11 and 12 on the battery pack 1 side and a control terminal TMc.

Figure 2:
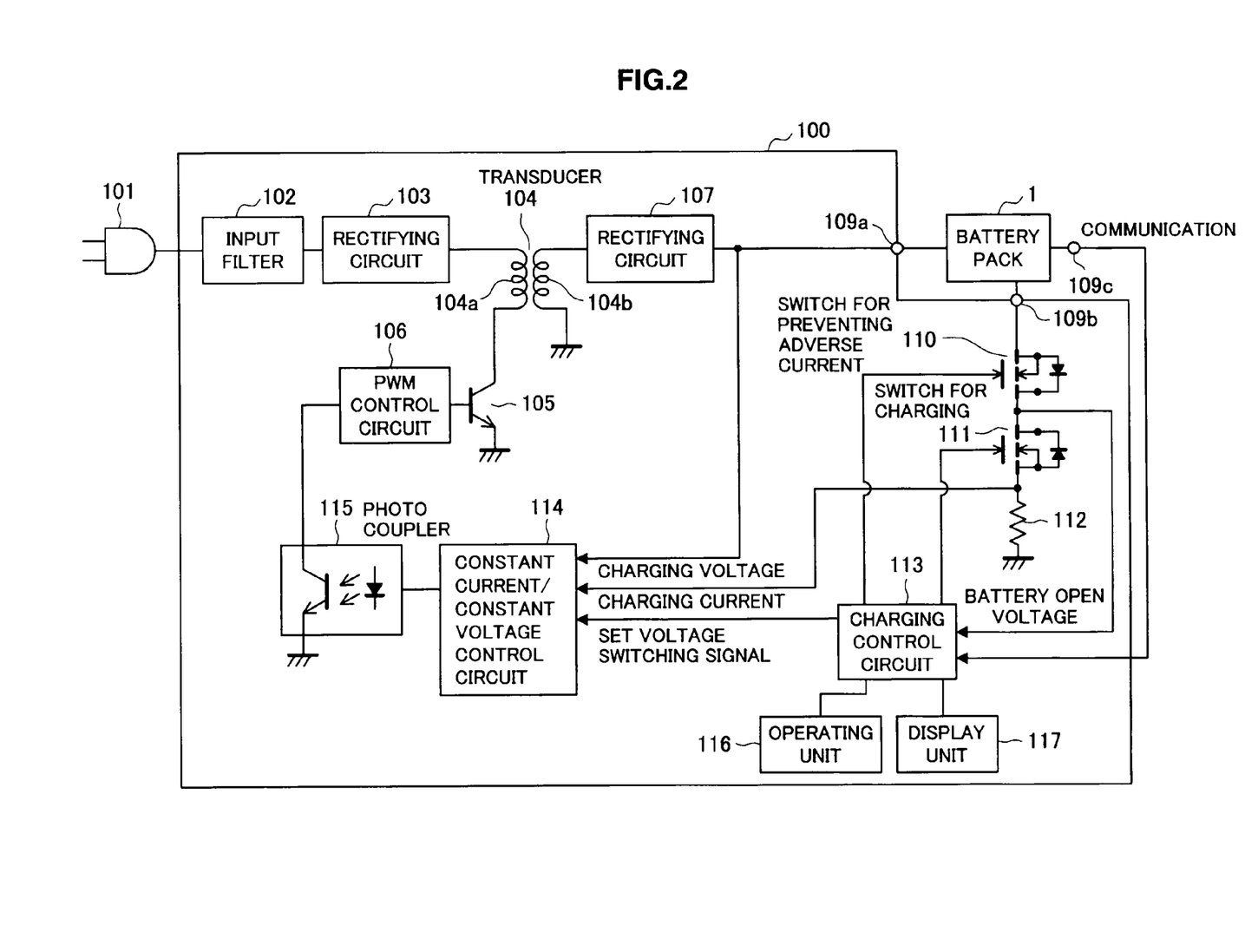
FIG. 2 is a block diagram illustrating a configuration of a charging apparatus of the battery pack according to the embodiment.

The charging apparatus 100 receives the information representing the sate of the battery pack 1 from the battery pack 1 via the control terminal 109c. The charging apparatus 100 sends the received information to a charging control circuit 113, and the charging control circuit 113 carried out various calculations, and information to be displayed is sent to a display unit 117. A display signal is generated from the information to be displayed on the display unit 117, and the display unit 117 displays the remaining battery capacity and excess of the maximum charging/discharging cycles as the battery state of the battery pack 1. A circuit which enables wired or wireless information exchange is used for the communication between the charging apparatus 100 and the battery pack 1.

(Configuration of the Charging Apparatus)

Next, a configuration of the charging apparatus 100 of the battery pack 1 according to the embodiment is described below. FIG. 2 is a block diagram illustrating the configuration of the charging apparatus 100 of the battery pack 1 according to the embodiment. The charging apparatus 100 has a primary circuit including an input filter 102, rectifying circuits 103 and 107 and a PMW control circuit 106, and a charging control circuit 113 which controls a constant voltage/constant current.

A plug 101 is provided to the charging apparatus 100, and a commercial power source of AC 100 V, for example, is supplied to the plug 101. The commercial power source supplied to the plug 101 is supplied to the rectifying circuit 103 via the input filter 102.

A rectified and smoothed DC voltage, which is obtained at the output side of the rectifying circuit 103, is supplied to one end of a primary winding 104a of a transducer 104. The other end of the primary winding 104a is connected to a collector of an npn type transistor 105 composing a switching element. An emitter of the transistor 105 is grounded. A pulse width modulating signal, which is acquired on the output side of a pulse width modulating (PWM) control circuit 106, is supplied to a base of the transistor 105. An output from the pulse width modulating (PWM) control circuit 106 switches the transistor 105, so as to control an output signal acquired at a secondary winding 104b of the transducer 104.

One end of the secondary winding 104b of the transducer 104 is connected to an input side of the rectifying circuit 107, and the other end of the secondary winding 104b is grounded. The rectifying circuit 107 supplies a DC voltage for charging obtained on the secondary winding 104b of the transducer 104 to a positive electrode charging terminal 109a connected to the positive electrode of the battery pack 1 so as to charge the battery pack 1.

A negative electrode charging terminal 109b connected to the negative electrode of the battery pack 1 is grounded via a series circuit including a back-flow prevention switch 110, a charging switch 111 and a current detection resistor 112.

The back-flow prevention switch 110 and the charging switch 111 are controlled by the charging control circuit 113 so that a charging period t0 and an open period t1 are repeated with a constant interval. In this case, the charging time t0 is a comparative long predetermined period, and the open period t1 is time sufficient for calculating a difference voltage $\Delta V$ between specified voltages of the comparatively short battery pack 1, such as an upper limit voltage Vh of a lithium ion secondary battery and a battery open voltage Vt of a lithium ion secondary battery 8.

The charging control circuit 113 turns both the back-flow prevention switch 110 and the charging switch 111 ON for the charging period t0. The charging control circuit 113 turns the back-flow prevention switch 110 ON and turns the charging switch 111 OFF for the open period t1. The charging control circuit 113 obtains a battery open voltage Vt of the battery pack 1 at a connection mid point between the back-flow prevention switch 110 and the charging switch 111 when the charging switch 111 is OFF. As a result, the charging control circuit 113 detects a difference voltage $\Delta V$ (=Vh–Vt) between specified voltages such as the upper limit voltage Vh of the lithium ion secondary battery and the battery open voltage Vt.

A constant current/constant voltage control circuit 114 charges the battery pack 1 at a constant current with a comparatively high first set voltage Vc1 within the upper limit voltage Vh of the battery pack 1 until a switching difference voltage $\Delta V1$ preset by the difference voltage $\Delta V$. The constant current/constant voltage control circuit 114 switches the set voltage into a second set voltage Vc2 lower than the first set voltage Vc1 when the difference voltage $\Delta V$ is lower than the switching difference voltage $\Delta V1$ so as to charge the battery pack 1 at a constant voltage. The first set voltage Vc1 is the upper limit voltage Vh of the battery pack 1 or a voltage near the upper limit voltage Vh. The second set voltage Vc2 is a voltage which is lower than the first set voltage Vc1.

When the difference voltage $\Delta V$ becomes lower than the preset switching difference voltage $\Delta V1$, the charging control circuit 113 generates a set voltage switching signal. The set voltage switching signal is a signal for switching the set voltage from the first set voltage Vc1 into the second set voltage Vc2. The charging control circuit 113 completes the charging at the time when the difference voltage $\Delta V$ is within a completion difference voltage $\Delta V0$ lower than the preset switching difference voltage $\Delta V1$.

Also, in the embodiment, a charging voltage a obtained on the output side of the rectifying circuit 107 is supplied to the constant current/constant voltage control circuit 114, and a charging current b obtained on the current detection resistor 112 is supplied to the constant current/constant voltage control circuit 114. A set voltage switching signal is further supplied from the charging control circuit 113 to the constant current/constant voltage control circuit 114.

The constant current/constant voltage control circuit 114 supplies a control signal for constant-current charging to the pulse width modulation control circuit 106 via a photo coupler 115. The constant current/constant voltage control circuit 114 supplies a control signal for constant voltage charging to the pulse width modulation control circuit 106 via the photo coupler 115. The control signal controls the pulse width modulation control circuit 106.

According to the embodiment, since the battery pack 1 is charged at a constant current with the comparatively high first set voltage Vc1 within the upper limit voltage Vh of the battery pack 1 until the difference voltage $\Delta V$ between the specified voltage of the battery pack 1 (for example, the upper limit voltage Vh of the battery pack 1) and the battery open voltage Vt becomes the switching difference voltage $\Delta V1$. As a result, in the charging apparatus 100 according to the embodiment, the constant current charging time can be prolonged, and the charging time up to the completion of the charging can be shortened. Further, when the difference voltage $\Delta V$ becomes smaller than the predetermined switching difference voltage $\Delta V1$, the set voltage is switched into the second set voltage Vc2 lower than the first set voltage Vc1 so that the battery pack 1 is charged at a constant voltage. As a result, in the charging apparatus 100 according to the embodiment, an excessive voltage is not generated, and thus the battery pack 1 is not danger of being deteriorated.

(Method for Calculating Recommended Charging Time)

Next, a method for calculating recommended charging time in the charging apparatus 100 according to the embodiment is described below.

The charging control circuit of the charging apparatus 100 according to the embodiment has, for example, a remaining capacity detecting unit, a necessary charging capacity obtaining unit, an additional charging capacity calculating unit, a charging current determining unit, a charging time calculating unit, a charging time output unit and a desired charging time obtaining unit.

The remaining capacity detecting unit detects a remaining capacity of the battery pack 1. The necessary charging capacity obtaining unit obtains a charging capacity necessary for use after the completion of the charging of the battery pack 1. The necessary charging capacity obtaining unit obtains expected use time of the battery pack 1 via a user's operation of an operating unit 116, and may calculate the charging capacity necessary for use after the completion of the charging of the battery pack 1.

The additional charging capacity calculating unit calculates an additional charging capacity for additionally charging the battery pack 1 based on the remaining capacity of the battery pack 1 and the charging capacity necessary for use after the completion of the charging of the battery pack 1. The charging current determining unit determines a charging current at the time of charging the additional charging capacity by means of the charging apparatus 100 based on power consumption generated at the time of charging the additional charging capacity.

The charging time calculating unit calculates charging time required for charging the additional charging capacity based on the determined charging current and additional charging capacity. The charging time output unit outputs the calculated charging time, for example, to the display unit 117. The desired charging time obtaining unit obtains desired charging time at the time of charging the additional charging capacity via a user's operation of the operating unit 116. At this time, the charging current determining unit determines a charging current based on the power consumption and the desired charging time.

The charging current of the lithium ion secondary battery has an upper limit value of 1 C normally. 1 C is a current value at the time when a cell having a capacity of a nominal capacity value is discharged at a constant current and the discharging is completed in 1 hour. For example, 1 C of a cell having the nominal capacity of 1000 mAh is 1000 mA. When a charging rate of the battery pack with IC of 1000 mA is made to be half, 0.5 C=500 mA.

Figure 3:
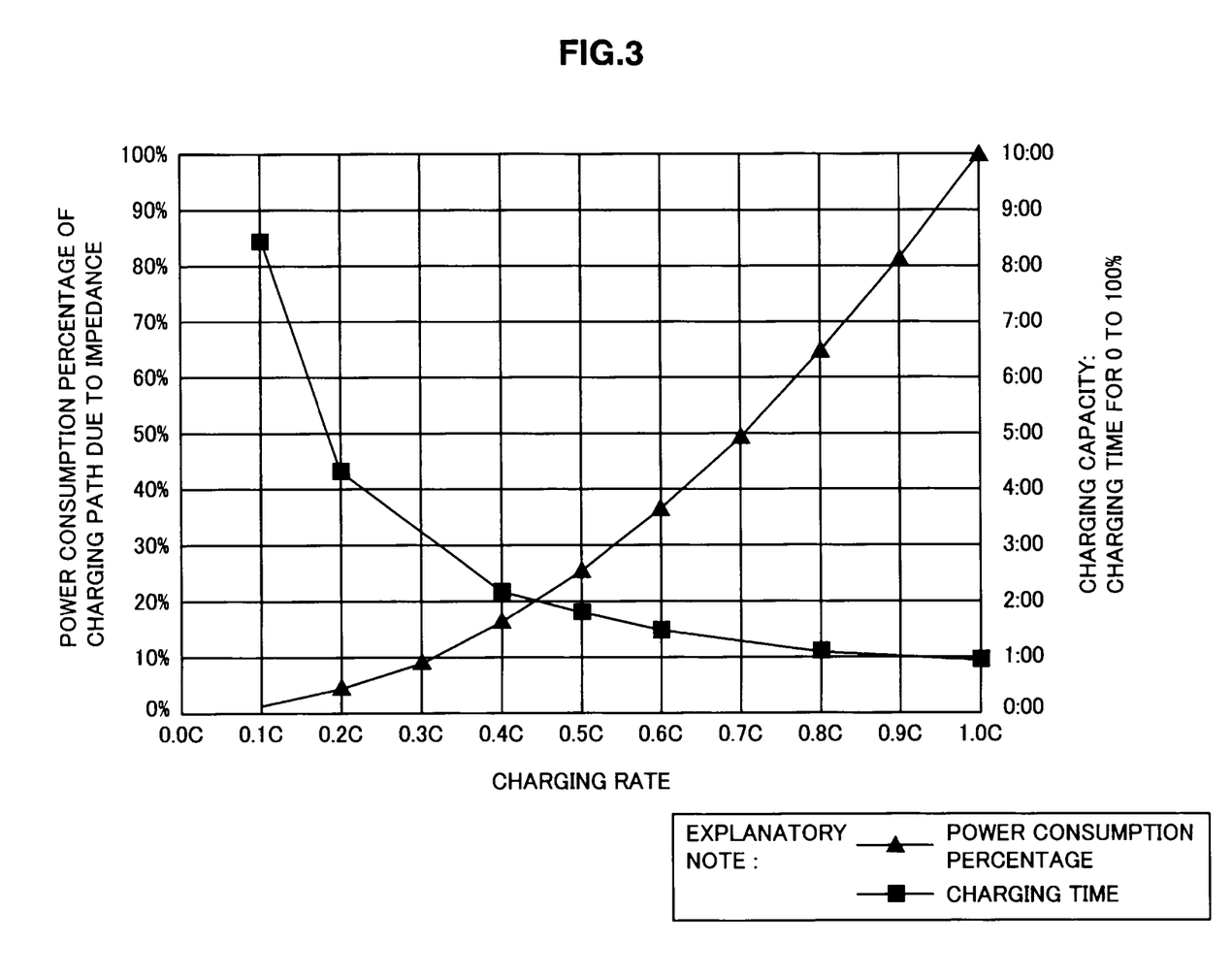
FIG. 3 is a graph illustrating relationships between a power consumption percentage due to impedance of a charging path and a charging rate and between charging time and the charging rate according to the embodiment.

FIG. 3 is a graph illustrating a relationship between a power consumption percentage due to impedance of a charging path and the charging rate and a relationship between the charging time and the charging rate. In FIG. 3, when the charging rate is changed, a change in the percentage of the power consumption due to the impedance (assumed as constant value) of the charging path is calculated theoretically. A first ordinate axis (the left side on the graph) in FIG. 3 represents that the percentage of the power consumption due to the impedance (assumed as constant value) of the charging path is 100% at the time of charging at 1 C.

Calculating formula: $P=R \times I^2$

P is the power consumption, R is the impedance of the charging path, and I is the charging current.

FIG. 3 is the graph illustrating a representative example of the charging time at the time when the battery pack is charged from 0% to 100% with the charging rate being changed. A second ordinate axis (the right side on the graph) in FIG. 3 represents a representative example of the charging time at the time when the battery pack is charged from 0% to 100%.

(1) When the charging current is low at the time of the charging, self heating can be repressed theoretically. Therefore, the recommended charging current may be set so that the self heating due to the charging current is repressed.

(2) When the charging rate (charging current) is reduced, a capacity deterioration due to the charging/discharging cycle can be reduced. In a representative example, when a discharging capacity of a certain sample after 1 cycle is compared with the discharging capacity after 300 cycles, the capacity deterioration is −20% at 0.7 C charging, but the capacity deterioration is −7% at 0.2 C, namely, the capacity deterioration is greatly reduced. Therefore, the target recommended charging current may be around 0.2 C which enables the capacity deterioration due to the charging/discharging cycle to be reduced.

(3) When user's convenience is taken into consideration, the recommended charging current may be set to a current value at which the charging of the remaining capacity from 0% to 100% is completed in one night (about 6 hours).

Due to the following reasons, in the representative example of the embodiment, the time for charging at 0.2 C is the recommended charging time.

(1) Viewpoint of the self heating: when the self heating at the time of 1 C charging is 100%, the heating is about 4% at 0.2 C charging, and thus the power consumption due to the heating can be repressed.

(2) Viewpoint of the capacity deterioration: in the case of 0.2 C charging, the capacity deterioration is reduced to −7% even after 300 cycles.

(3) Viewpoint of the charging time: the charging time becomes about 8 hours and 30 minutes at 0.1 C charging, and thus the charging is not completed in one night, but the charging time becomes about 4 hours and 15 minutes at 0.2 C charging, and thus the charging is completed in one night.

The recommended charging time is not limited to the time of charging at 0.2 C, and may be determined at another charging rate from these three viewpoints.

The additional charging time is calculated according to formula 1.

Additional charging time={(remaining capacity set by user)−(remaining capacity before charging)}÷charging current      Formula 1

The maximum charging current changes due to a difference between the voltage (remaining capacity) of the cell and the charging voltage form the charging apparatus 100, and obtains an approximately constant value in each type of cells. For this reason, a relationship between the remaining capacity and the maximum charging current is checked in advance, and the data is retained in the battery pack 1 or the charging apparatus 100.

When the user specifies an desirable expected use time (or expected use remaining capacity), estimated charging time at 0.2 C charging which is saved in the battery pack 1 or the charging apparatus 100 is displayed as the recommended charging time on the display unit 117 of the charging apparatus 100.

Figure 5:
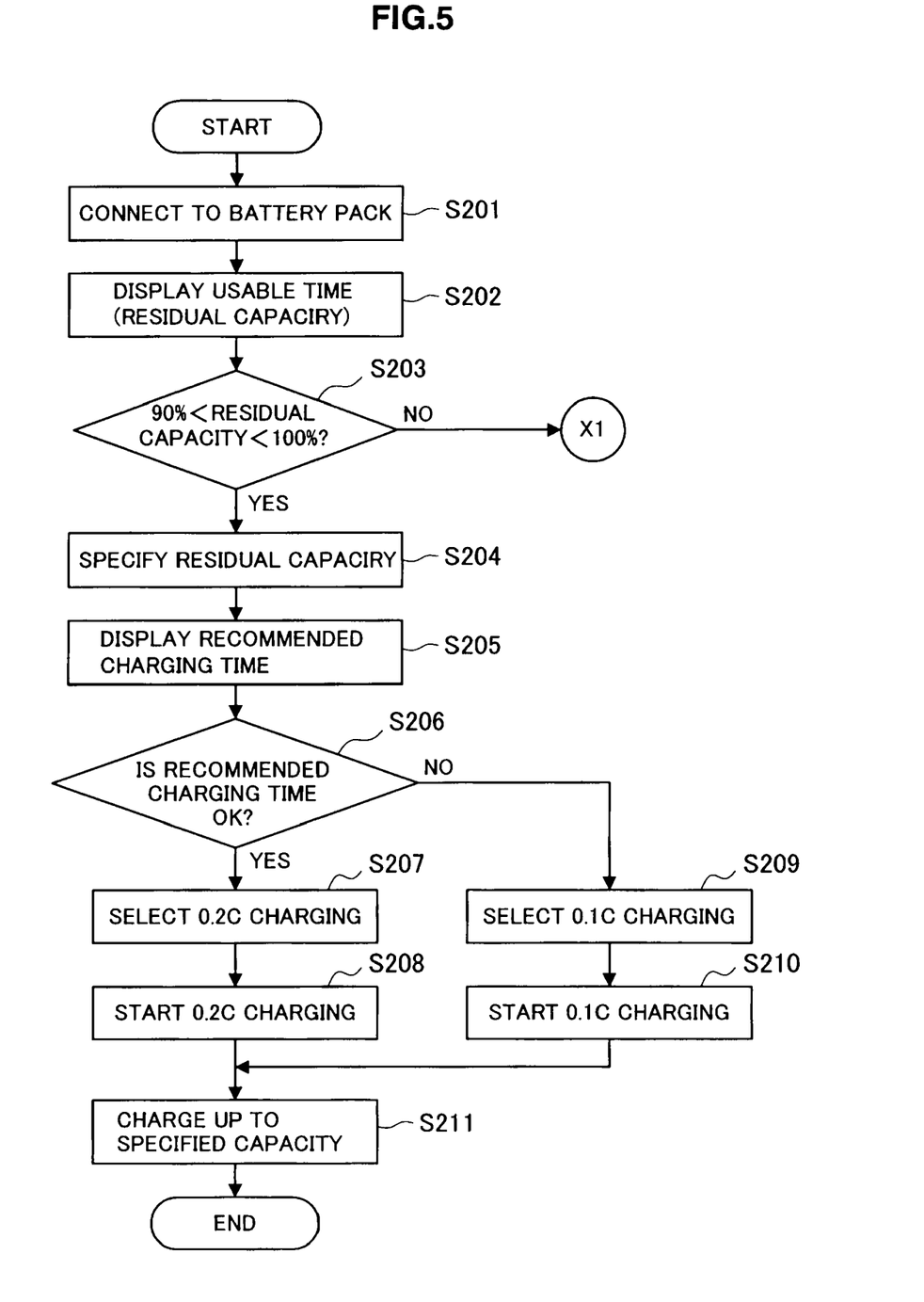
FIG. 5 is a flow chart illustrating the charging operation according to a remaining capacity of the charging apparatus according to the embodiment.
Figure 6:
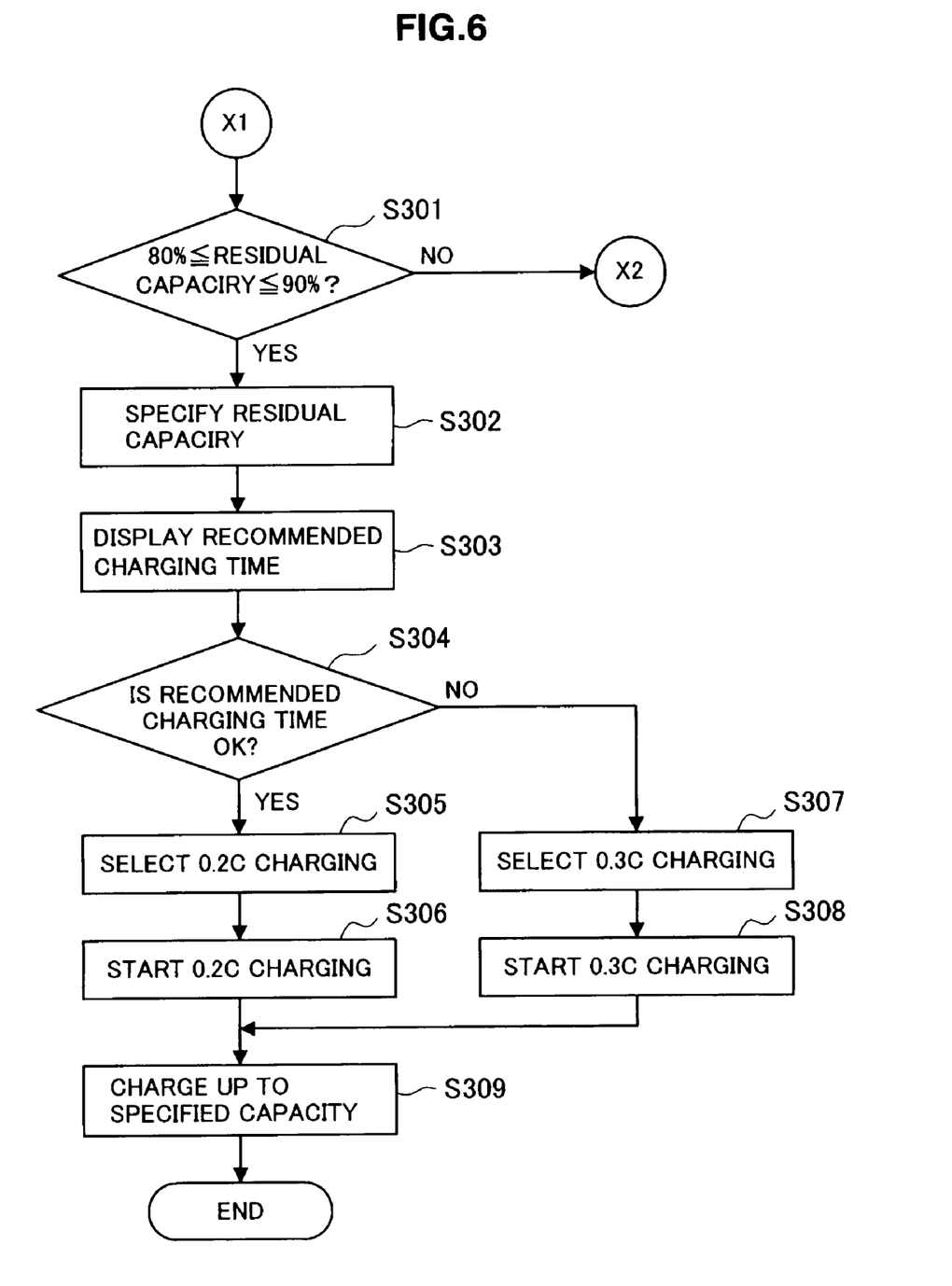
FIG. 6 is a flow chart illustrating the charging operation according to a remaining capacity of the charging apparatus according to the embodiment.
Figure 7:
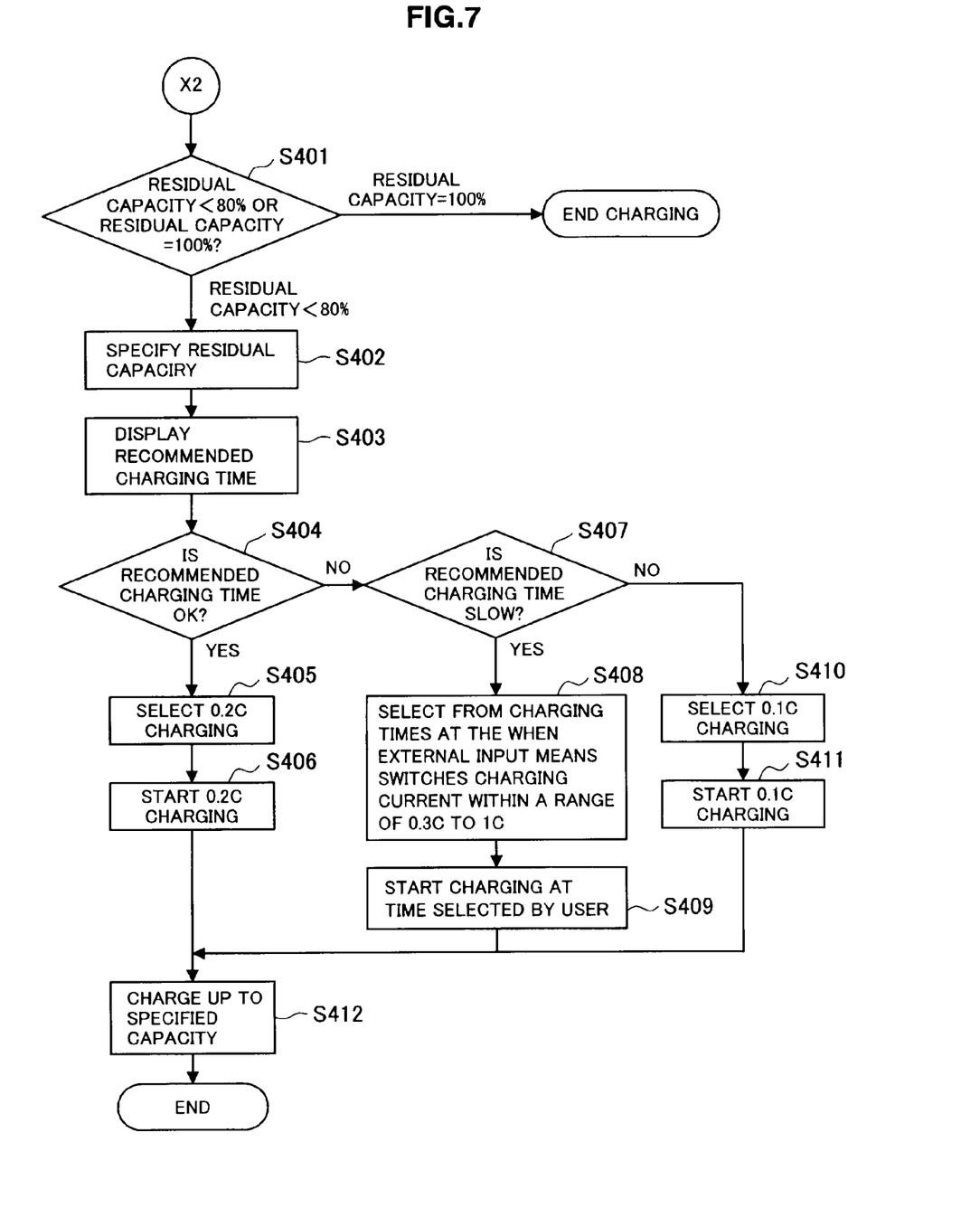
FIG. 7 is a flow chart illustrating the charging operation according to the remaining capacity of the charging apparatus according to the embodiment.

The recommended charging time changes due to the remaining capacity before charging. Flow charts in FIGS. 5 to 7 illustrate examples where after the user selects a necessary remaining capacity, how the charging time can be selected. FIGS. 5 to 7 are flow charts illustrating the charging operation according to the remaining capacity of the charging apparatus 100 according to the embodiment.

The charging operation is described with reference to FIG. 5. The battery pack 1 is connected to the charging apparatus 100 (step S201). The remaining capacity is detected, and the usable time (remaining capacity) is displayed (step S202).

When a determination is made that the remaining capacity is larger than 90% and smaller than 100% (step S203), the operation at step S204 to S211 is performed. First, the user specifies a desired charging remaining capacity (time) (step S204). The charging apparatus 100 displays the recommended charging time based on the desired charging remaining capacity (step S205). When the user determines that the displayed recommended charging time is OK (step S206), the charging apparatus 100 selects 0.2 C charging (step S207), so as to start the 0.2 C charging (step S208). The battery pack 1 is charged up to the capacity specified at step S204 (step S211).

On the other hand, the user determines that the displayed recommended charging time is not OK and the charging time may be longer (step S206), the charging apparatus 100 selects 0.1 C charging (step S209), so as to start the 0.1 C charging (step S210). The battery pack 1 is charged up to the capacity specified at step S204 (step S211). At steps S209 and S210, the charging time becomes longer than that at steps S207 and S208, but the power consumption can be reduced.

When the remaining capacity is larger than 90% and smaller than 100%, the charging apparatus 100 does not carry out the 0.3 C charging due to a performance of the battery pack, and thus this is omitted from options.

The charging operation is described with reference to FIG. 6. When a determination is made that the remaining capacity is 80% or more and 90% or less based on the detected remaining capacity (step S301), the operation at steps S302 to S309 is performed. When the user specifies the desired charging remaining capacity (time) (step S302). As a result, the charging apparatus 100 displays the recommended charging time based on the desired charging remaining capacity (step S303). When the user determines that the displayed recommended charging time is OK (step S304), the charging apparatus 100 selects 0.2 C charging (step S305), so as to start the 0.2 C charging (step S306). The battery pack 1 is charged up to the capacity specified at step S302 (step S309).

On the other hand, the user determines that the displayed recommended charging time is not OK and shorter charging time is preferable (step S304), the charging apparatus 100 selects 0.3 C charging (step S307), so as to start the 0.3 C charging (step S308). The battery pack is charged up to the capacity specified at step S302 (step S309). At steps S307 and S308, the charging time becomes shorter than that at steps S305 and S306, but the power consumption becomes slightly high.

After step S304, an option for selecting and starting 0.1 C charging may be provided. At this time, the charging time becomes longer than that at steps S305 and S306, but the power consumption can be reduced.

The charging operation is described with reference to FIG. 7. When the remaining capacity is 100% based on the detected remaining capacity (step S401), the charging operation is not necessary and thus is ended. On the other hand, when the determination is made that the remaining capacity is smaller than 80% based on the detected remaining capacity (step S401), the operation at steps S402 to S412 is performed. First, the user specifies desired charging remaining capacity (time) (step S402). As a result, the charging apparatus 100 displays recommended charging time based on the desired charging remaining capacity (step S403). When the user determines that the displayed recommended charging time is OK (step S404), the charging apparatus 100 selects 0.2 C charging (step S405), so as to start the 0.2 C charging (step S406). The battery pack 1 is charged up to the capacity specified at step S402 (step S412).

On the other hand, when the user determines that since the displayed recommended charging time is slow, this recommended charging time is not OK and shorter charging time is preferable (step S407), the charging apparatus 100 accepts a user's operation of the operating unit 116, and selects charging from 0.3 C charging to 1 C charging (step S408) so as to start the charging at the selected charging rate (step S409). When the battery pack 1 is charged up to the capacity specified at step S402 (step S412). At steps S408 and S409, the charging time becomes shorter than that at steps S405 and S406, but the power consumption becomes slightly high.

On the other hand, the user determines that the displayed recommended charging time is not OK and longer charging time is preferable (step S407), the charging apparatus 100 selects 0.1 C charging (step S410), so as to start the 0.1 C charging (step S411). The battery pack 1 is charged up to the capacity specified at step S402 (step S412). At steps S410 and S411, the charging time becomes longer than that at steps S405 and S406, but the power consumption can be reduced.

(Method for Setting the Remaining Capacity and the Charging Time)

When the battery pack 1 is connected to the charging apparatus 100, the charging apparatus 100 displays a result of detecting the remaining capacity as the usable time (remaining capacity). Therefore, the user sets as to how much the remaining capacity is made to be higher than the current remaining capacity through the operation of the operating unit 116.

As for charging time, when the battery pack 1 is connected to the charging apparatus 100, the charging apparatus 100 displays recommended charging time. Therefore, the user sets whether the charging time is faster or slower than the recommended charging time (usable time (remaining capacity) desired by the user) through the operation of the operating unit 116.

The operating unit 116 which accepts the user's operation is, for example, a ten key or up and down buttons. The necessary charging capacity and charging time set by the user are displayed on the display unit 117. The operating unit 116 has a pressing button which accepts definition. The pressing button for accepting the definition may be used also as a trigger button for starting the charging, but the trigger button may be provided separately.

(Method for Switching the Charging Current)

After the user selects the necessary remaining capacity and determines the charging time, the charging current is calculated according to formula 2.

$$\text{Charging current} = \{(\text{remaining capacity set by user}) - (\text{remaining capacity before charging})\} \div \text{charging time} \quad \text{Formula 2}$$

The charging apparatus 100 carries out the charging at the calculated charging current using the following method. The charging current to the battery pack 1 can be switched by varying the electric current linearly using means for dividing the charging current of the charging apparatus 100 into a plurality of electric currents due to resistive division, PWM, or the D/A conversion (see FIG. 2).

(The Charging Operation of the Charging Apparatus and Display at the Time of Charging)

Figure 9:
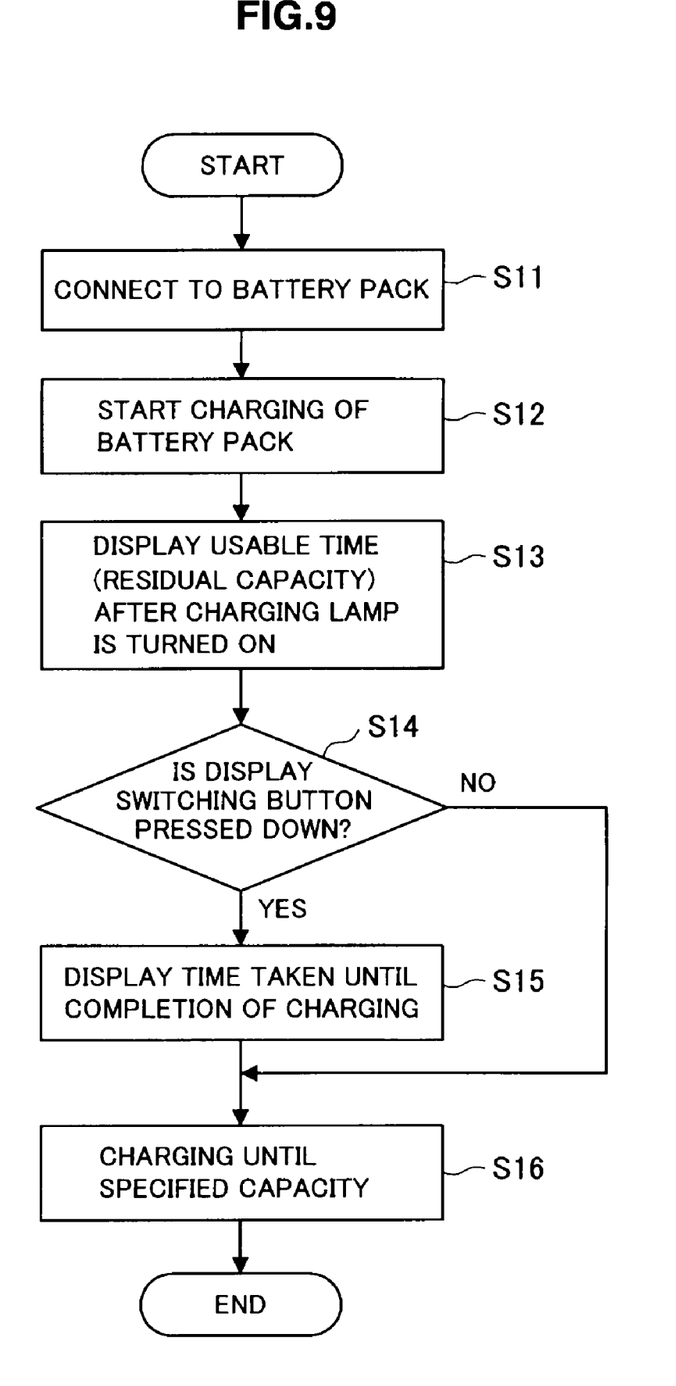
FIG. 9 is a flow chart illustrating the charging operation of a past charging apparatus.

The charging operation of a past charging apparatus and an example of the charging display from the start to end of the charging are described as a comparative example. FIG. 9 is a flow chart illustrating the charging operation of the past charging apparatus. FIG. 10 is an explanatory diagram illustrating the display example at the time of the charging the past charging apparatus.

Figure 10A:
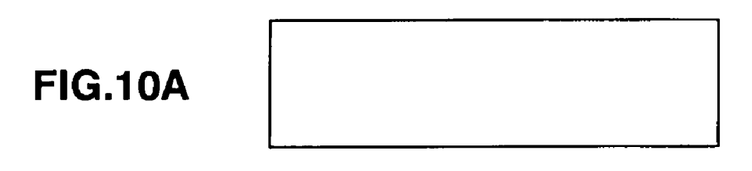
FIGS. 10A-10G is an explanatory diagram illustrating display example at the time of charging a past charging apparatus.
Figure 10B:
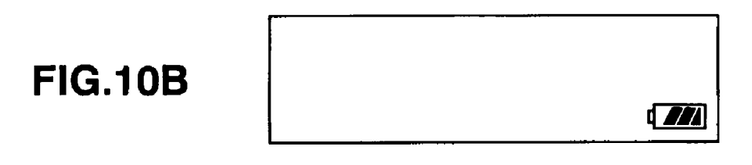
Figure 10C:
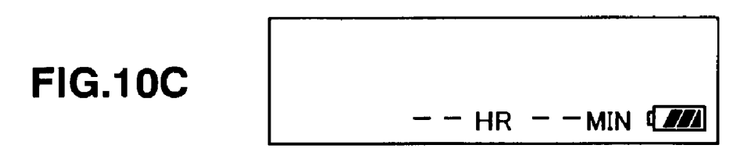

The display example of the past charging apparatus is described. After the charging apparatus is powered on, when the battery pack is not attached, the display is as shown in FIG. 10A. After the battery pack is connected to the charging apparatus (step S11), the display is as shown in FIG. 10B just after the starting of the charging (step S12). While the charging apparatus is checking the charging amount of the battery pack, as shown in FIG. 10C, "–" is displayed as the charging time. When the charging apparatus checks the charging amount of the battery pack, as shown in FIG. 10F, the usable time is displayed (step S13). During the charging, a charging lamp is turned on.

Figure 10D:
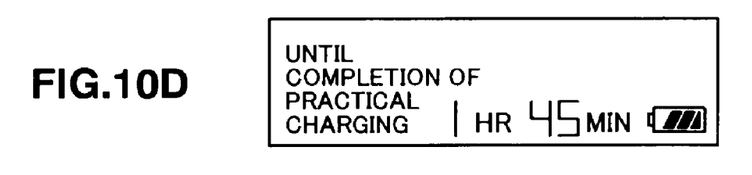
Figure 10E:
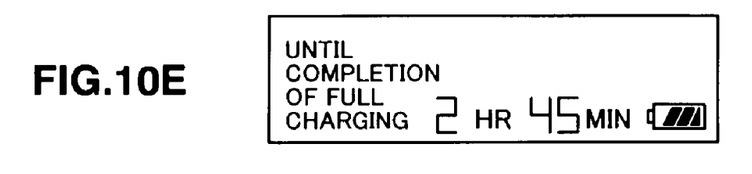
Figure 10F:
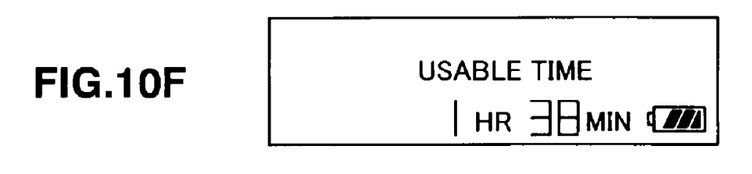
Figure 10G:
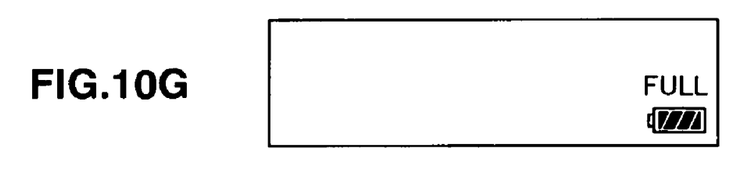

From the state of FIG. 10F, when a display switching button of the charging apparatus is pressed once (step S14), as shown in FIG. 10D, the time at which the charging up to practical charging (about 90% of the full charging) is completed is displayed (step S15). From the state of FIG. 10D, when the display switching button of the charging apparatus is once pressed, the time at which the full charging is completed is displayed as shown in FIG. 10E (step S15). From the state of FIG. 10E, when the display switching button of the charging apparatus is once pressed, the display returns to the state of FIG. 10F, and the usable time is displayed. When the full charging is completed, as shown in FIG. 10G, "FULL", for example, is displayed on a battery mark (step S16).

Figure 4:
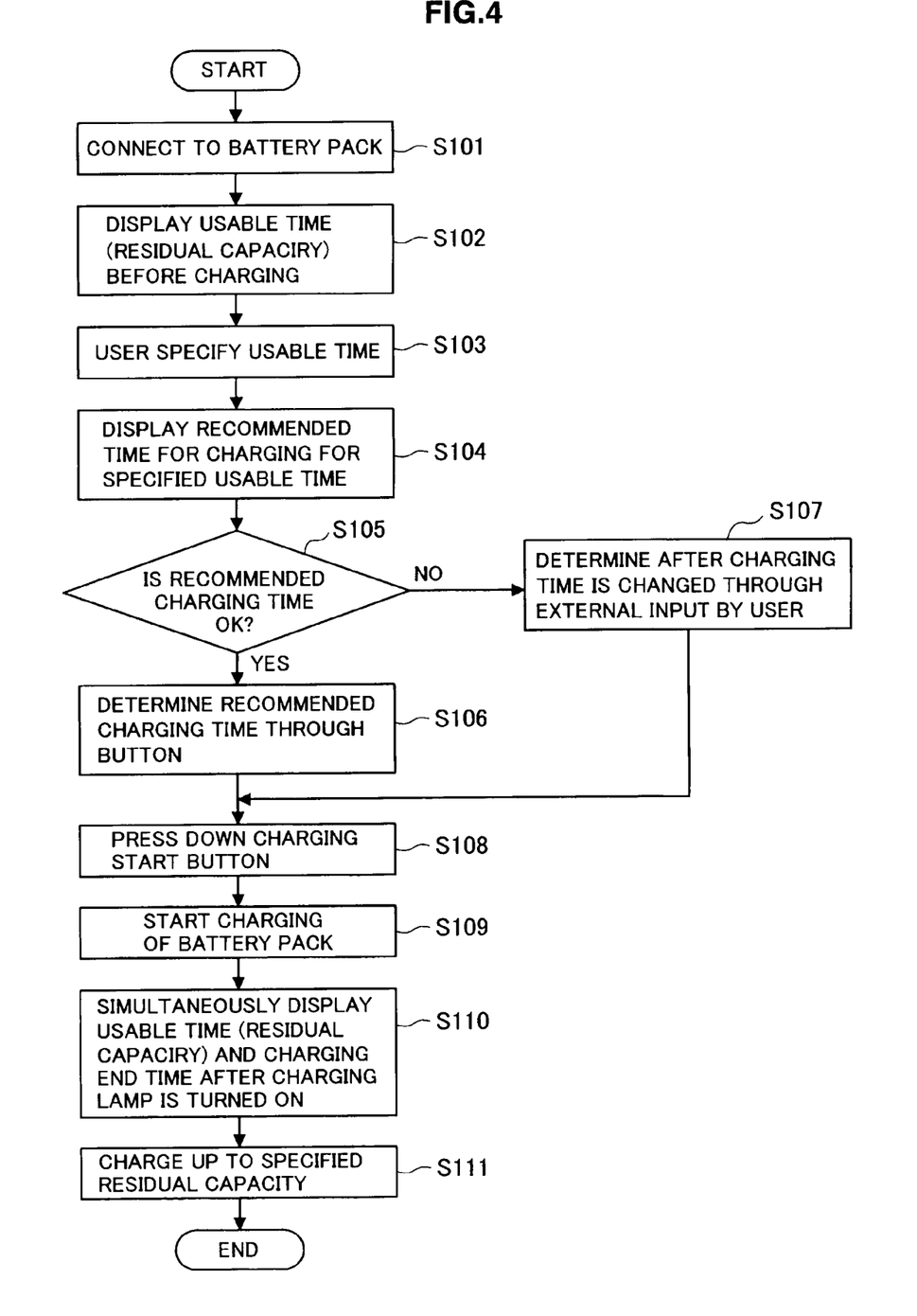
FIG. 4 is a flow chart illustrating a charging operation of the charging apparatus according to the embodiment.

The charging operation and the display example of the charging apparatus according to the embodiment are described below. FIG. 4 is a flow chart illustrating the charging operation of the charging apparatus according to the embodiment. FIG. 8 is an explanatory diagram illustrating the display example at the time of charging by the charging apparatus 100 according to the embodiment.

Figure 8A:
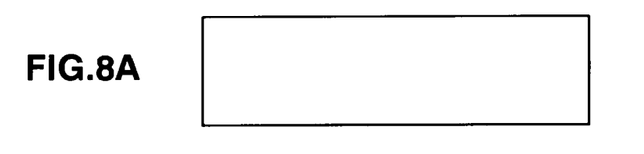
FIGS. 8A-8H is an explanatory diagram illustrating display example at the time of charging the charging apparatus according to the embodiment.
Figure 8B:
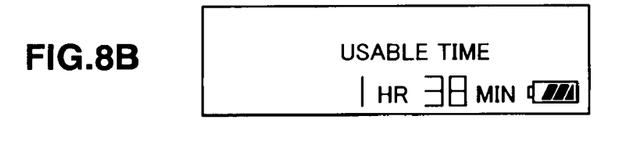
Figure 8C:
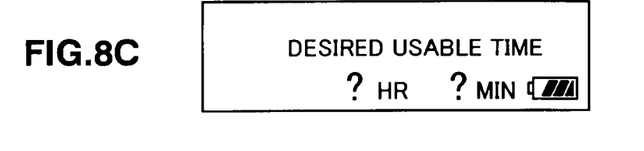
Figure 8D:
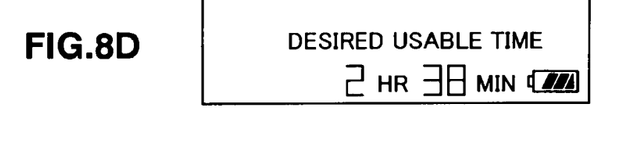

When the battery pack 1 is not attached after the charging apparatus 100 is powered on, the display is as shown in FIG. 8A. After the battery pack 1 is connected to the charging apparatus 100 (step S101), when the charging apparatus 100 conforms the charging amount of the battery pack 1, the usable time is displayed as shown in FIG. 8B (step S102). As shown in FIG. 8C, the charging apparatus 100 requests the user to input desired usable time. When the user inputs and determines the desired usable time, the display is as shown in FIG. 8D (step S103).

Figure 8E:
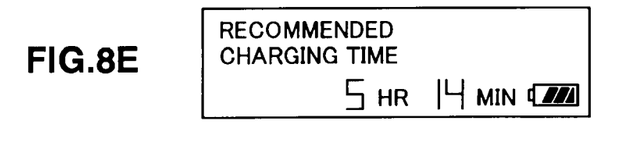

As shown in FIG. 8E, the charging apparatus 100 displays recommended charging time for the charging for the specified desired usable time (step S104). When the user determines that the displayed recommended charging time is OK (step S105), determines the recommended charging time through pressing of the button (step S106) and the charging start button is pressed (step S108), the charging is started (step S109).

Figure 8F:
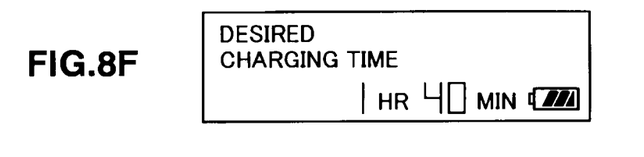
Figure 8G:
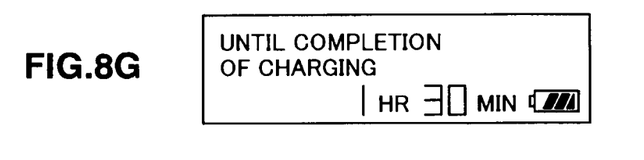
Figure 8H:
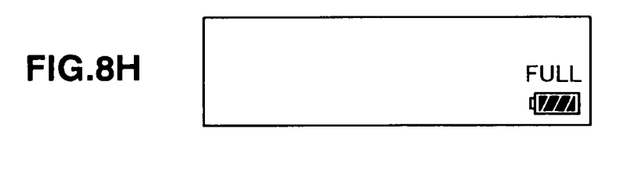

On the other hand, when the displayed recommended charging time is determined as being improper (step S105) and the display switching button is pressed, the display is switched into display where the desired charging time can be input. When the user inputs the desired charging time, the display is as shown in FIG. 8F. When the user determines the desired charging time (step S107) and presses the charging start button (step S108), the charging is started (step S109). After the charging is started, the charging lamp is turned on, the usable time (remaining capacity) and, as shown in FIG. 8G, the time until the completion of the charging are displayed by minutes in a countdown manner (step S110). The battery pack 1 is charged up to the specified remaining capacity (step S111). When the full charging is completed, for example, "FULL" is displayed on the battery mark as shown in FIG. 8H.

Effects of the embodiment are described below.

(1) When the battery pack 1 is charged, the battery pack 1 is self-heated by the flowing of the charging current because the charging path in the battery pack 1 has impedance. The electric power supplied from the charging apparatus 100 is consumed uselessly due to this heating.

The calorific power (power consumption) can be calculated based on the impedance and the charging current in the circuit according to the following formula:

Calculating formula: $P = R \times I^2$

P is the power consumption, I is the charging current, and R is the impedance of the charging path.

Therefore, when the user does not hurry to charge the battery pack 1 with necessary charging amount, the charging time is slowed down (made to be longer) with respect to the recommended charging time displayed after the necessary remaining capacity is specified as shown in FIG. 4 by the operating unit 116 so that the charging current of the charging apparatus 100 can be set lower. When the self heating due to the charging current of the battery pack 1 is repressed, the consumption of excessive power can be reduced.

(2) When the battery cell 20 contained in the battery pack 1 is left for only 3 months with its remaining capacity being high (about 4.2 V per cell) under normal-temperature environment, the remaining capacity is reduced by about 10% due to self discharging. For this reason, when a lot of remaining capacity is not necessary and the battery pack which is fully charged is used a little and is left, the energy is uselessly consumed by the self discharging.

However, as shown in the flow chart of the charging operation of a past charging apparatus in FIG. 9, when the battery pack is charged all the way with the control of the past charging apparatus, the battery pack is fully charged as long as the user does not remove the battery pack 1 from the charging apparatus during the charging. Further, it is difficult for the user to select necessary remaining capacity.

On the other hand, according to the embodiment, as shown in the flow chart of the charging operation according to the embodiment in FIG. 4, when the battery pack 1 is connected to the charging apparatus 100, the remaining capacity of the battery pack 1 before charging is displayed as the usable time on the display unit 117. The user can increase the displayed usable time using the operating unit 116 such as a ten key so as to specify necessary usable time (increase in the charging amount).

(3) In related art, since a user may not specify the remaining capacity and thus the battery pack is charged fully, only the charging time required for the full charging or the charging of about 90% is displayed. On the other hand, in the embodiment, as shown in the flow chart of the charging operation according to the embodiment in FIG. 4, after the user specifies the preferable usable time (remaining capacity), the recommended charging time is displayed on the display unit 117 of the charging apparatus 100. When the user desires the charging faster or slower than the recommended charging time, the user can change the charging time via the operating unit 116.

The charging current for calculating the recommended charging time should be switched according to the remaining capacity and the type of the battery cells 20 contained in the battery pack 1. The charging characteristic of the battery cells 20 are checked in advance, and the relationship between the remaining capacity and the charging current is stored in the internal memory of the charging apparatus 100. The charging current is utilized for calculating the recommended charging time.

The present application contains subject matter related to that disclosed in Japanese Priority Patent Application JP 2008-214617 filed in the Japan Patent Office on Aug. 22, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

The above embodiment describes the case where the apparatus which charges the battery pack 1 is the charging apparatus 100, but the present invention is not limited to this example. For example, this apparatus may be a video camera, a digital still camera, mobile telephone, or a personal computer as long as it can charge the battery pack 1, can acquire information about the charging from the battery pack 1 and can display the information about the charging.

What is claimed is:

1. A charging apparatus comprising:
 a charging unit which charges a battery;
 a remaining capacity detecting unit which detects a remaining capacity of the battery;
 a necessary charging capacity obtaining unit which obtains charging capacity necessary for use after completion of the charging of the battery;
 an additional charging capacity calculating unit which calculates additional charging capacity for additional charging the battery based on the remaining capacity and the additional necessary charging capacity of the battery;
 a charging current determining unit which determines a charging current at the time when the charging unit charges for the additional charging capacity based on power consumption generated at the time of charging the additional charging capacity;
 a charging time calculating unit which calculates charging time required for charging for the additional charging capacity based on the determined charging current and the additional charging capacity;
 a charging time display unit which displays the calculated charging time;

an input device with receives a user input of whether or not the calculated charging time is too long, acceptable, or shorter then necessary; and a control unit which lowers the determined charging current when the user input is that the calculated charging time is shorter than necessary and controls the charging unit based on the determined charging current.

2. The charging apparatus according to claim 1, comprising:

a desired charging time obtaining unit which obtains desired charging time at the time of charging for the additional charging capacity, wherein the charging current determining unit determines the charging current based on the power consumption and the desired charging time.

3. The charging apparatus according to claim 1, wherein the necessary charging capacity obtaining unit obtains expected use time of the battery so as to calculate charging capacity necessary for use after the completion of the charging of the battery.

4. A charging method comprising:

charging a battery;

detecting remaining capacity of the battery;

obtaining charging capacity necessary for use after completion of the charging of the battery;

calculating additional charging capacity for additionally charging the battery based on the remaining capacity and the necessary charging capacity of the battery;

determining a charging current at the time when a charging unit charges for the additional charging capacity based on power consumption generated at the time of charging for the additional charging capacity;

calculating a charging time required for charging for the additional charging capacity based on the determined charging current and the additional charging capacity;

displaying the calculated charging time;

receiving a user input of whether or not the calculated charging time is too long, acceptable, or shorter then necessary; and lowering the determined charging current when the user input is that the calculated charging time is shorter than necessary; and controlling the charging unit based on the determined charging current.

5. The charging method according to claim 4, wherein the determining a charging current determines the charging current to be 20% of a value of a current at which the battery is discharged in one hour, and the lowering lowers the charging current to be 10% of the value of the current at which the battery is discharged in one hour when the user input is that the charging time is shorter than necessary.

6. The charging apparatus according to claim 1, wherein the charging current determining unit determines the charging current to be 20% of a value of a current at which the battery is discharged in one hour, and the control unit lowers the charging current to be 10% of the value of the current at which the battery is discharged in one hour when the user input is that the charging time is shorter than necessary.

* * * * *